United States Patent [19]
Staschewski

[11] 3,757,280
[45] Sept. 4, 1973

[54] CONNECTING STRUCTURE FOR HELICALLY CORRUGATED TUBING

[75] Inventor: Alfred Staschewski, Langenhagen, Germany

[73] Assignee: Kabel-und Metallwerke Gutehoffnungshutte Aktiengesellschaft, Hannover, Germany

[22] Filed: May 24, 1972

[21] Appl. No.: 256,445

[30] Foreign Application Priority Data
May 29, 1971 Germany.................. P 21 26 871.3

[52] U.S. Cl........... 339/177 R, 174/89, 285/DIG. 4, 285/399, 285/405
[51] Int. Cl........................................... H01r 17/04
[58] Field of Search................ 174/75 C, 88 C, 89; 285/DIG. 4, 363–368, 374, 399, 405–412; 339/177

[56] References Cited
UNITED STATES PATENTS

| | | | |
|---|---|---|---|
| 2,438,472 | 3/1948 | Calcott........................ | 285/405 X |
| 3,291,895 | 12/1966 | VanDyke................... | 339/177 R X |
| 3,568,111 | 3/1971 | Dyer............................ | 174/88 C X |
| 3,460,855 | 8/1969 | Belden......................... | 285/406 X |

FOREIGN PATENTS OR APPLICATIONS

| | | | |
|---|---|---|---|
| 1,089,836 | 9/1960 | Germany.............................. | 174/89 |
| 11,050 | 5/1914 | Great Britain...................... | 285/364 |

Primary Examiner—Marvin A. Champion
Assistant Examiner—Lawrence J. Staab
Attorney—Ralf H. Siegemund

[57] ABSTRACT

Connecting structure for helically corrugated tubing comprising an integral flange on the tube extending radially from along a crest line of the corrugation and following the helical corrugation of the tube. A coupling element with axially directed abutment surface having also helical configuration and matching the helical corrugation of the flange, and being placed into partial or complete abutment therewith.

3 Claims, 3 Drawing Figures

CONNECTING STRUCTURE FOR HELICALLY CORRUGATED TUBING

BACKGROUND OF THE INVENTION

The present invention relates to a coupling element for connection to a helically corrugated tube. Preferably, but not exclusively, the invention relates to coupling structure for connection to a coaxial conductor pair with helically corrugated outer conductor.

Coaxial conductors with a tubular outer conductor, including those with corrugation, are usually beaded or flanged at the ends for purposes of connection to other tubes, to plug elements or otherwise. Flanging is desired to obtain a sufficiently large area for contact making. However, if the outer conduction tube has helical corrugation, the flange does not have a uniform contour. The tube end face when in a plane transverse to the tubes axis, may run partially through a corrugation crest, partially through a valley and/or partially through in-between portions of the corrugation; this depends on the pitch of the helix. The overall contour of the tubes end in that plane is no longer circular, but oblong or otherwise distorted and it is also off center. If now the flange has to be worked from such an end, flanging becomes quite complicated, requiring special machinerey and is all in all an expensive procedure. Moreover, irregularities in length of the cut tube can be off-set only with difficulties. The flange must not be too high (radially) nor too low as that complicates flanging further.

The problems outlined above are particularly prelevant in coaxial cables, particularly upon installing such cables, and if the requirement has been made that two or more cables are to run next to each other at precisely the same length. Also, the relation in length of inner and outer conductors is critical. As a consequence, local trimming, adjustment etc., was found to be necessary to an excessive degree.

DESCRIPTION OF THE INVENTION

It is an object of the present invention to provide a coupling element for connection to helically corrugated tubing, which is simpler and inherently includes features that readily permit compensation of length variations. In accordance with the preferred embodiment of the invention, it is suggested to provide the tube with a helical flange, for example, along a corrugation crest line, and to provide a coupling element with an axially facing abutment edge or shoulder of matching contour.

The fact that the flange has been worked out of portions of the tube along a corrugation crest permits the flange to have uniform contour along the circumference. Of course, the flange is not a closed loop as it follows the helix, but that is off-set by the similarly helical configuration of an abutment surface in the coupling element. The coupling element can be threaded onto the flanged tube's end, which permits axial length adjustment of the tube plus coupling element, as only partial engagement of flange and helical shoulder is necessary in many cases.

While the specification concludes with claims particularly poiting out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates in side elevation the end of a flanged corrugated tube next to a section through a coupling element to be threaded at and onto the flange;

FIG. 2 illustrates a side elevation, partially cut open, of a coaxial conductor pair with helically corrugated outer conductor tube and helical end flange next to the coupling element shown here also in elevation; and FIG. 3 illustrates in perspective view the helically corrugated tube as it is prepared for end flanging.

DESCRIPTION OF THE DRAWINGS

Proceeding now to the detailed description of the drawings.

Figure 3:
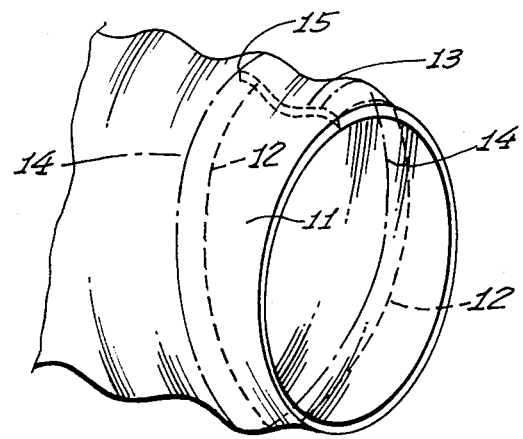

The flange has been worked after a piece 11 has been cut along the dotted line 12 in FIG. 3. Dotted line 12 follows the corrugation but somewhat axially off-set from a corrugation crest line (dash dot-line). An axial cut line portion 13 separates the end piece 11 from the remainder of the tube, due to the fact that the helical line of cutting is not in itself a closed loop. The flange 2 is worked out of the portion that extends between the dotted and the dash dot-lines in FIG. 3 and remains integral with the tube.

A back support element 6, resembling a nut, has been threaded onto the tube 1. The back support element 6 has a helical front face 61, that follows a groove of the threading of element 6. The helical cut 12 must be made as to its "phase" with regard to the corrugation, so that the flange 2 properly abuts face 61 from the rear. The flange even may have been formed against that helical face 61.

A coupling element 3 is to be placed on the end of tube 1 as flanged. Element 3 has a bore 4 with a shoulder portion 5 of helical configuration. That shoulder defines the helical but axially facing abutment surface mentioned above and against which the flange 2 is to be placed. Line 5a denotes the continuation of the helical shoulder face in the portion cut away in the section view. The shoulder face 5 covers one complete turn around the axis. It can be threaded onto flange 2 and maintained thereat from almost minimal contact to complete contact over a complete turn. Each position in-between corresponds to a different axial position of element 3 relative to tubing 1.

Shoulder 5 can be threaded onto the flange 2, whereby the position in axial direction can vary over about one "wavelength" L of the corrugation pattern in axial direction depending how deep flange 2 is threaded into bore 4 in abutment with helical face 5. However, the available range is not quite "one wavelength" L, as the contact between shoulder face 5 and flange 2 should not be minimal, but by no means is it always necessary that the entire helical flange 2 abuts the entire helical shoulder face 5. In the desired position, outer flange 31 of coupler 3 is bolted or clamped to a flange 62 on element 6. The annular gap between the flanges 31 and 62 can be filled with a sealer.

Figure 1:
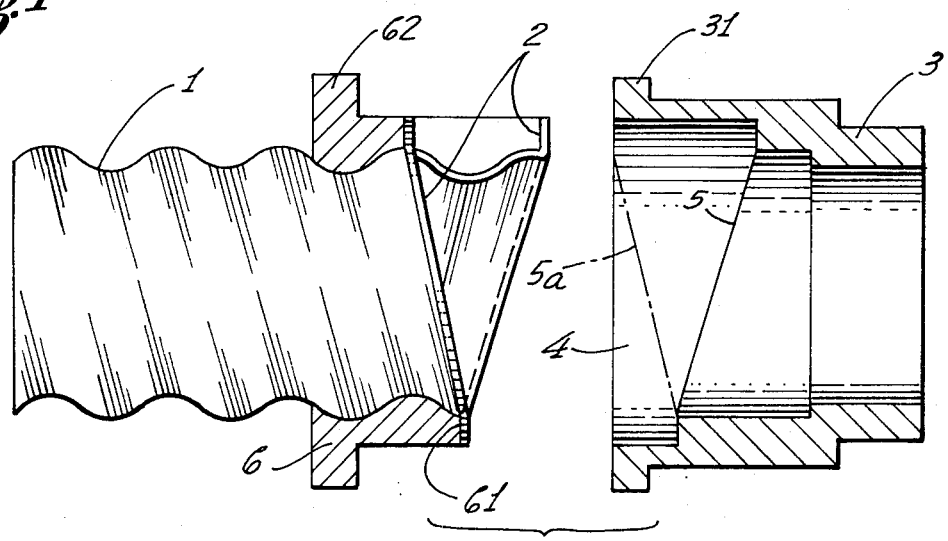
FIG. 1 illustrates an aluminum tube 1 with helical corrugation. The end of the tube is provided with a flange 2 which extends helically along the corrugation pattern, particularly the flange 2 extends radially, from along a crest line of the corrugation. In the projection of FIG. 1 the flange has V-shaped contour.
Figure 2:
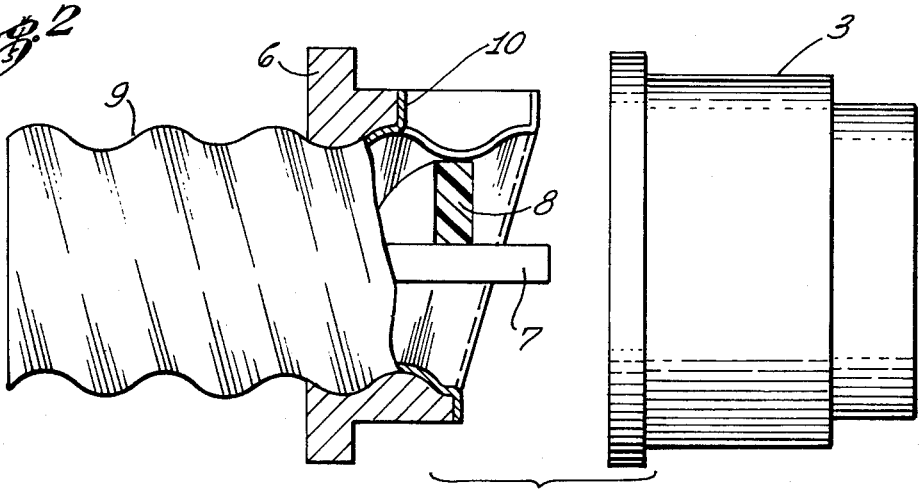

Proceeding now to the example of FIG. 2 illustrating the preferred use of the invention, reference numeral 9 refers again to a tube with helical corrugation. However, this tube 9 is the outer conductor of a coaxial conductor pair, having an inner conductor 7 and a helical spacer 8 which supports the outer conductor tube 9 on the inner conductor 7. The coupling element 3 in this case is, thus, provided as connection for this h.f. cable. Flange 10 of tube 9 corresponds to and has been made in a manner similar to flange 2 of FIG. 1. The inner conductor 7 is connected inside of connector 3 in the usual manner.

If the length of the outer conductor 9 as made is exactly as desired, element 3 will have its helical abutment face 5 threaded onto flange 10 to obtain complete surface-to-surface contact between them, over the entire azimuthal length of each helical, axial surface.

As was mentioned above, the situation may arise that two or more cables of equal length have to be installed, for example, between a radio station and the radio transmission tower. The cables operate in parallel as the power to be transmitted is too high for one coax system alone. Obviously, the signals as transmitted must remain in phase, and that requires accurate matching of the cable length. It is, however, rather improbable that the two cables are, in fact, of equal length per se, so that they must be mutually matched, or one must be matched to the other. The cable length in each case can now be adjusted (extended) by turning coupling element 3, and length adjustment is here somewhat analogous to micrometer action. Accordingly, even differences in length of a few millimeters can readily be adjusted.

If it turns out that a cable as cut from a supply is already somewhat too long, the helical cut (as per line 12, FIG. 1a) can be extended along the helix, to obtain a helical end face which in its point farthest in the corrugation (15 in FIG. 3) has shortened the tube length axially below the desired cable length. That is to say the point 15 in FIG. 3 taken as an axial end point for the tube defines a local axial length for the tube that is not longer than the desired tube length. That, in turn, permits accurate axial length adjustment of the cable through micrometer-like adjustment threading action of element 3 on flange 10.

The length adjustment of the outer tube can likewise be carried out by threading element 3 onto helical flange 10 for matching the outer conductor length to the already established length of the inner conductor.

The invention is not limited to the embodiments described above but all changes and modifications thereof not constituting departures from the spirit and scope of the invention are intended to be included.

I claim:

1. Connecting structure for helically corrugated tubing comprising, an integral flange on the tube, having helical configuration and extending radially from along a crest line of the corrugation, thereby following the helical corrugation of the tube; and a coupling element with axially facing abutment surface having helical configuration matching the helical corrugation of the tube and the configuration of the flange, and placed into partial or complete abutment with the flange.

2. Structure as in claim 1, and including a back support element threaded onto the helically corrugated tube and having an axially facing support face of helical configuration, and placed in the back of the flange.

3. Structure as in claim 1, wherein the coupling element is an electrical plug element.

* * * * *